United States Patent [19]
Wilkinson

[11] 4,091,433
[45] May 23, 1978

[54] PROTECTIVE RELAY CIRCUIT FOR INTERPHASE FAULTS

[75] Inventor: Stanley B. Wilkinson, Havertown, Pa.

[73] Assignee: General Electric Company, Philadelphia, Pa.

[21] Appl. No.: 767,279

[22] Filed: Feb. 10, 1977

[51] Int. Cl.² .................................................. H02H 3/26
[52] U.S. Cl. ............................................ 361/76; 361/79; 361/86
[58] Field of Search .................. 361/76, 79, 85, 86, 361/87; 324/86, 87, 83 A, 108; 307/127

[56] References Cited

U.S. PATENT DOCUMENTS

| | | | |
|---|---|---|---|
| 2,406,411 | 8/1946 | Sonnemann | 361/76 |
| 3,626,281 | 12/1971 | Souillard | 361/76 X |

OTHER PUBLICATIONS

"Single Pole Switching on TVA's Paradise Davidson 500-KV Line" by L. Edwards et al., IEEE Transactions on Power Apparatus and Systems, vol. 90, pp. 2436-2450, Jul.-Dec. 1971.

*Primary Examiner*—Patrick R. Salce
*Attorney, Agent, or Firm*—William Freedman; Michael F. Petock; Carl L. Silverman

[57] ABSTRACT

This protective relay circuit responds to interphase faults on a three-phase power line by causing a circuit breaker connected in the power line to be tripped three-pole in response to interphase faults, but does not respond to a single line to ground fault, allowing a single pole to be tripped for this latter type of fault.

12 Claims, 16 Drawing Figures

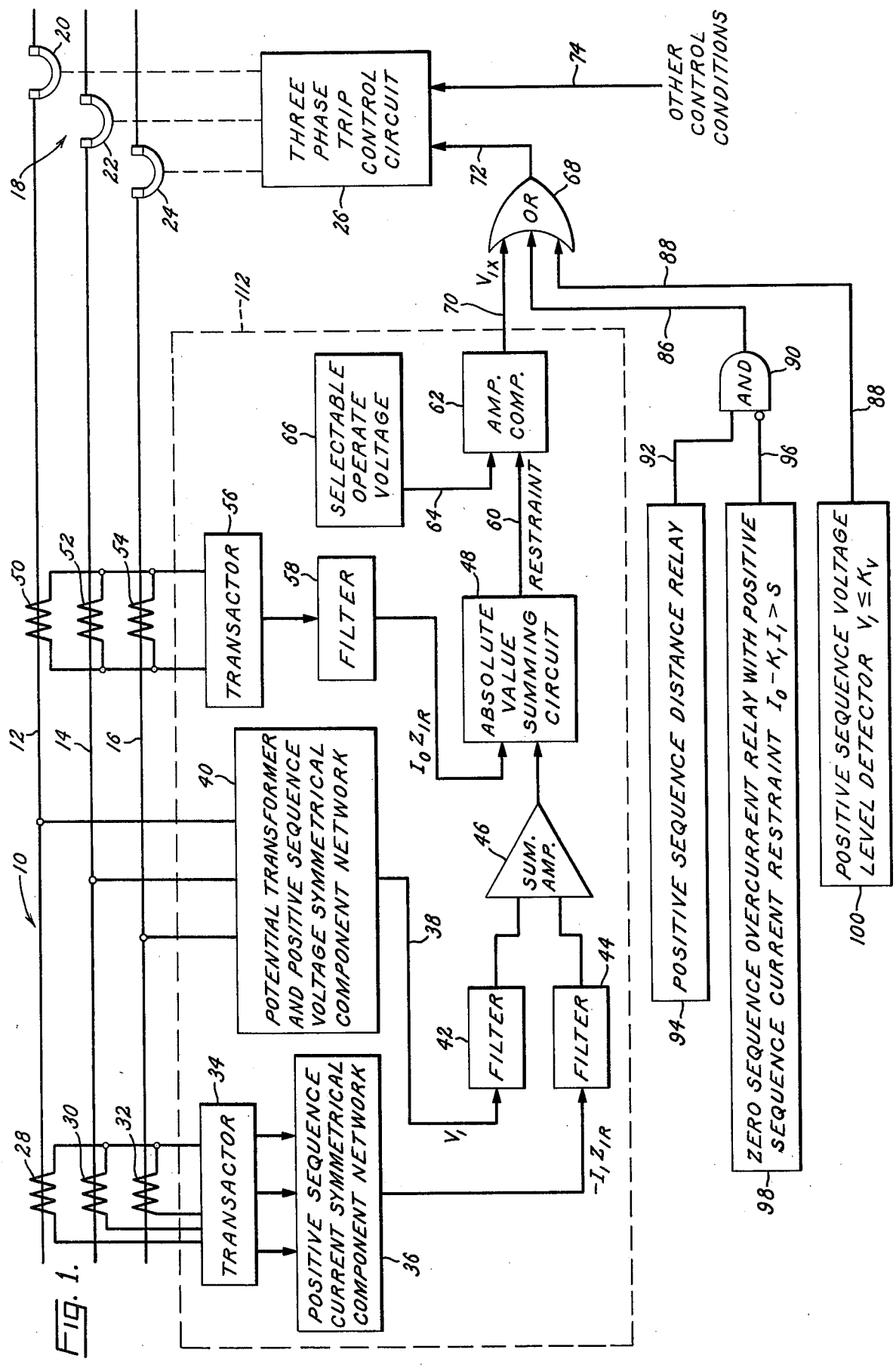

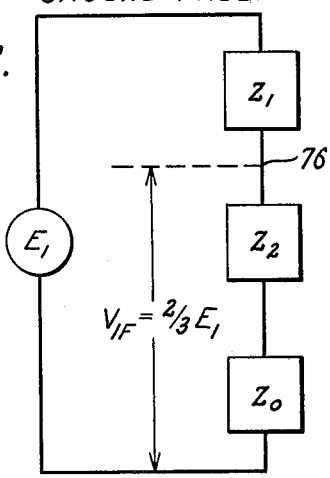
Fig. 2. SINGLE LINE TO GROUND FAULT
$V_{IF} = \tfrac{2}{3} E_1$
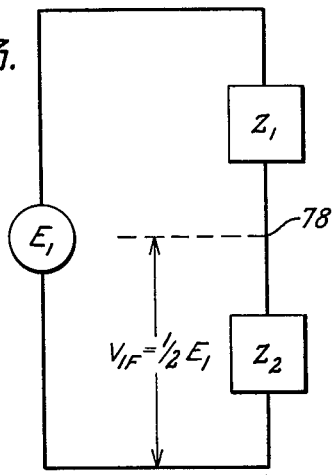
Fig. 3. LINE TO LINE FAULT
$V_{IF} = \tfrac{1}{2} E_1$
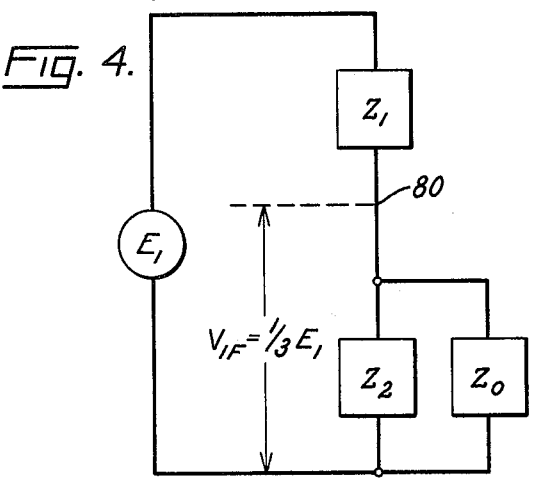
Fig. 4. DOUBLE LINE TO GROUND FAULT
$V_{IF} = \tfrac{1}{3} E_1$
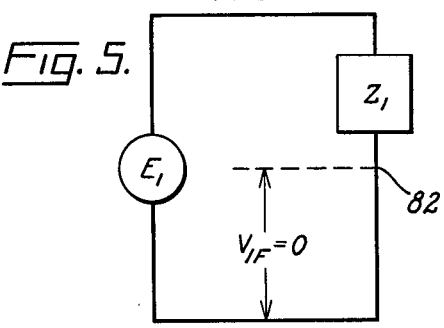
Fig. 5. THREE PHASE FAULT
$V_{IF} = 0$
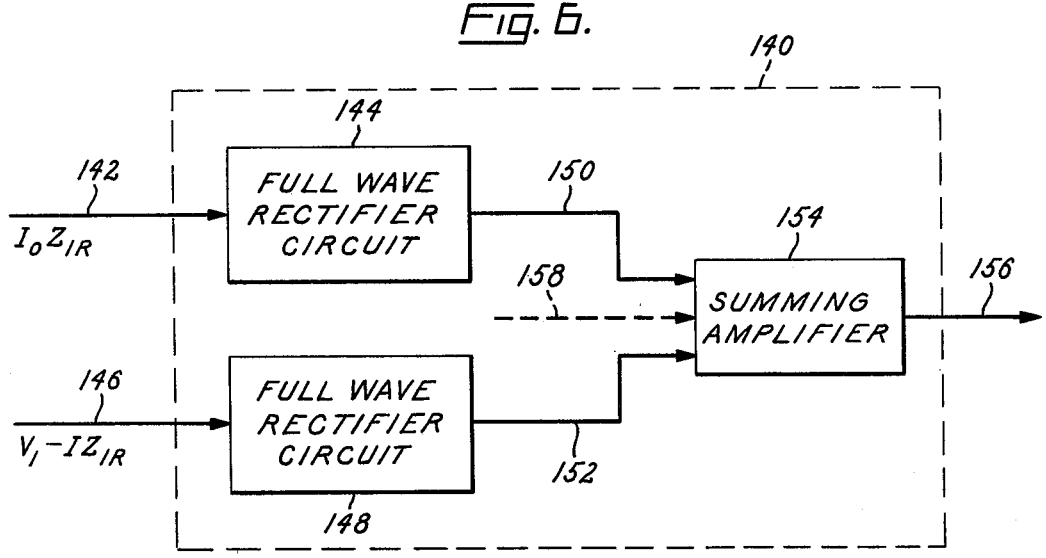
Fig. 6.

FAULT AT END OF LINE
(FIGS. 7-10)
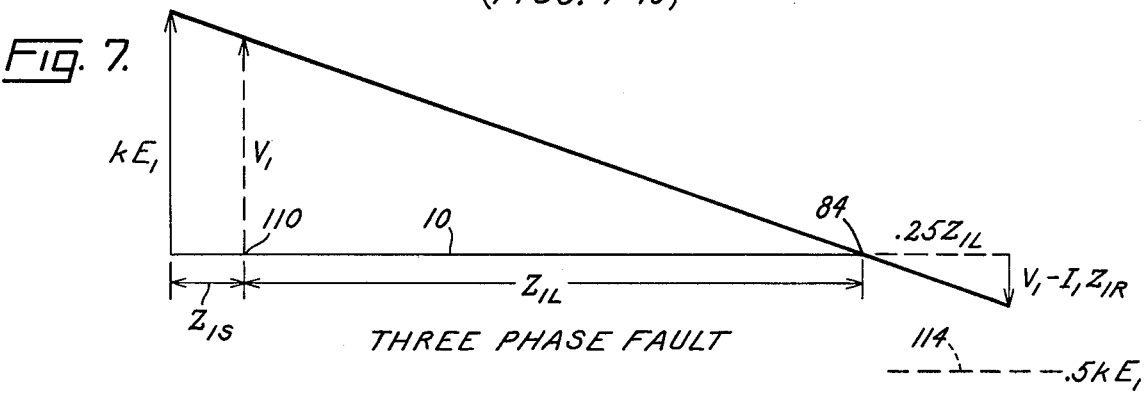
Fig. 7. THREE PHASE FAULT
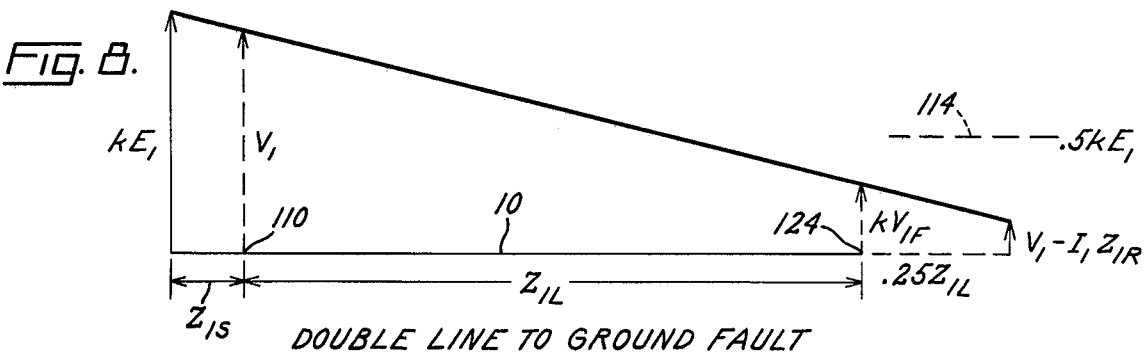
Fig. 8. DOUBLE LINE TO GROUND FAULT
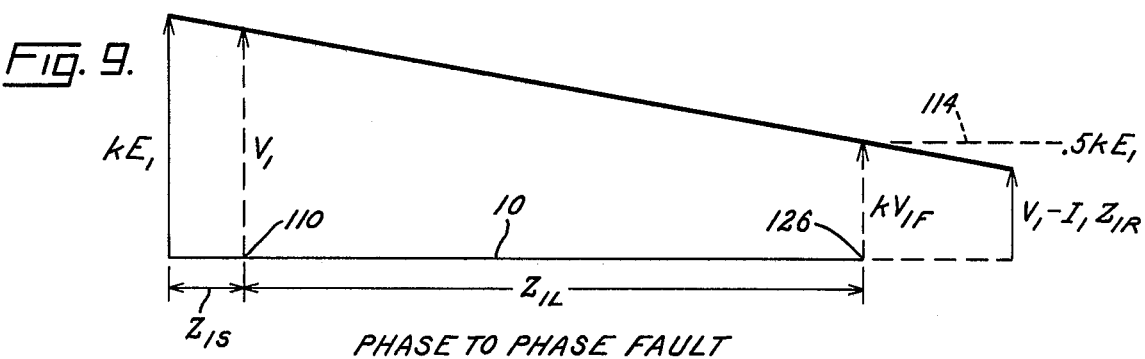
Fig. 9. PHASE TO PHASE FAULT
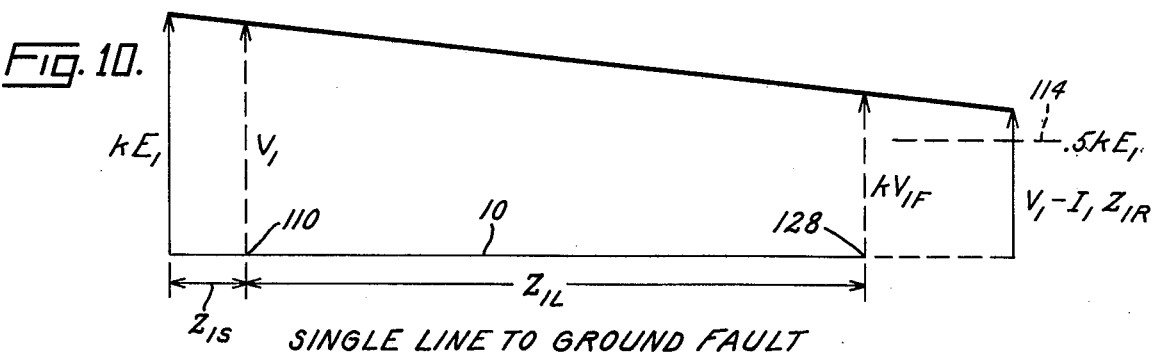
Fig. 10. SINGLE LINE TO GROUND FAULT FAULT AT MIDDLE OF LINE
(FIGS. 11-14)
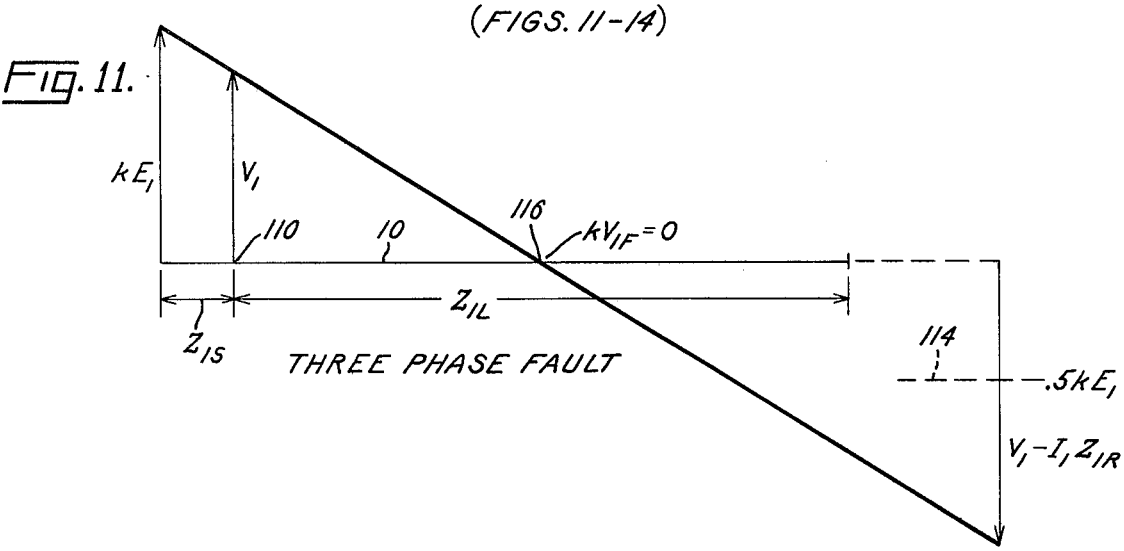
Fig. 11. THREE PHASE FAULT
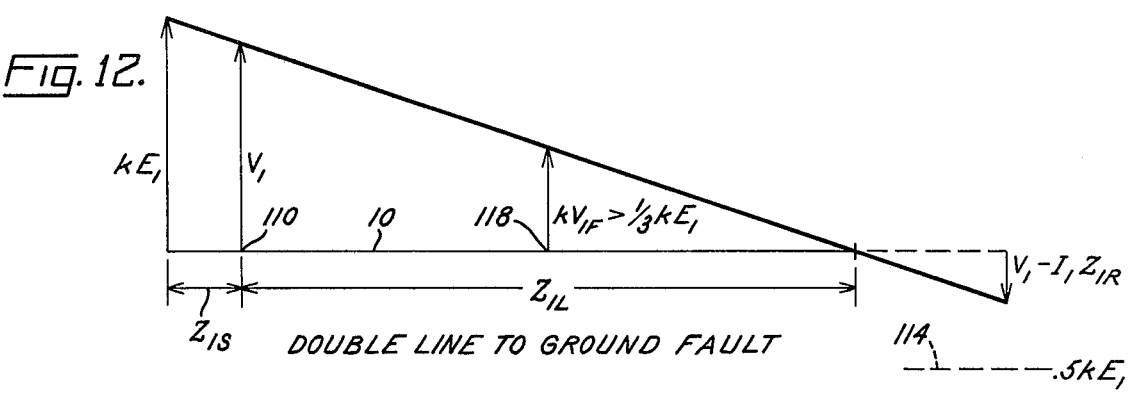
Fig. 12. DOUBLE LINE TO GROUND FAULT
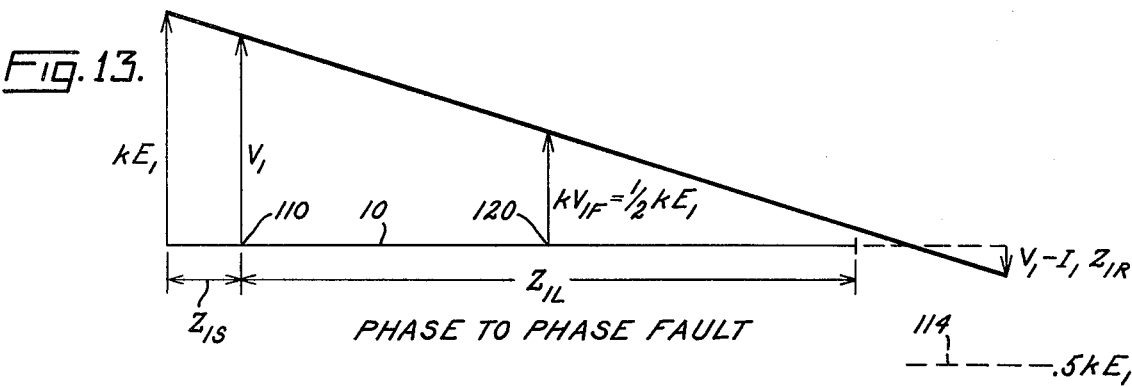
Fig. 13. PHASE TO PHASE FAULT
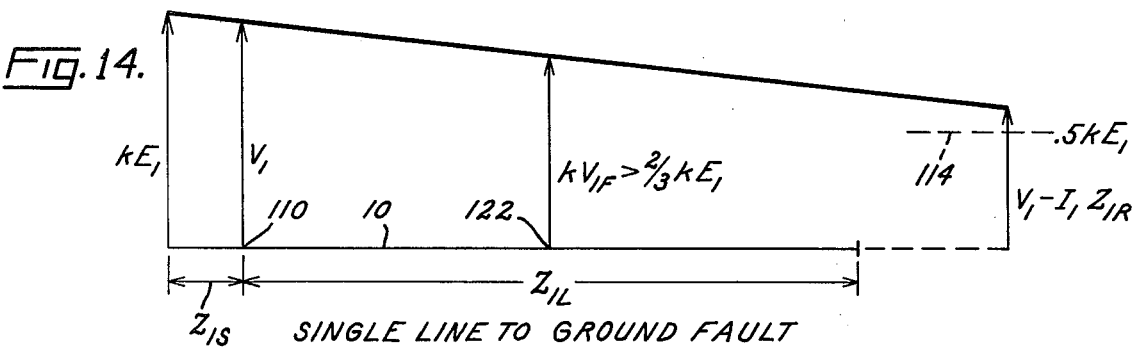
Fig. 14. SINGLE LINE TO GROUND FAULT

PROTECTIVE RELAY CIRCUIT FOR INTERPHASE FAULTS

BACKGROUND OF THE INVENTION

The present invention relates to a protective relay circuit for selectively operating on interphase faults. More particularly, the present invention is directed to a protective relaying circuit which utilizes symmetrical component values to permit tripping of three poles of a breaker selectively on interphase faults only, and selectively discriminates against three pole tripping on single line to ground faults.

In the past, it has been known that under certain conditions it is advantageous to be able to trip a single pole of a three phase alternating current power transmission line, and under other circumstances to be able to trip all three poles of the three phase line. Where a single line to ground fault occurs internal to the line being protected, it is highly desirable to be able to trip only a single pole. Where interphase faults occur, such as double line to ground faults, phase to phase faults and three phase faults, it is highly desirable to be able to accurately and rapidly detect such conditions and to generate a three pole trip signal which enables the tripping of the three poles of a circuit breaker, assuming that other signals supplied to the three phase trip control circuit indicate that the fault is internal to the line being protected. In the past, appropriate pole trip selection for various types of faults was based on signals from a combination of phase and ground distance relays. However, this arrangement was not always satisfactory since the ground distance relays would not always detect fault conditions where there was a high resistance fault. Another method of approaching the problem of the detection of interphase faults on a three phase power transmission line has been directed to the detection of differences between the magnitudes of the voltages of the three phases on the line. However, this method suffers from the disadvantage that the differences in the voltages may not be substantial where there is a relatively small source impedance, even though an interphase fault has occurred on the line.

The present invention utilizes the fact that certain predetermined per unit symmetrical component voltages occur at a fault depending upon the nature of the fault. The theory of symmetrical components is well understood by those skilled in the art of electric power transmission and distribution. In accordance with this theory, the phase currents or voltages in any unbalanced three phase alternating current electric circuit can be resolved into three sets of symmetrical, balanced current or voltage vectors known respectively as the positive sequence component, the negative sequence component and the zero sequence component. The negative and zero sequence components of circuit currents and voltages are not present under balanced circuit conditions. A more detailed discussion of the theory of symmetrical components may be found in the textbook, Symmetrical Components, by Wagner and Evans, published by McGraw-Hill in 1933.

SUMMARY OF THE INVENTION

An advantage of the present invention is that it is capable of providing an enabling signal for the tripping of the three poles of a circuit breaker on a three phase alternating current power transmission line for all interphase faults, but is capable of simultaneously discriminating against single line to ground faults.

A more specific advantage of the present invention is that it detects interphase fault conditions independent of source impedance. This is an extremely important advantage since the present invention accurately detects interphase faults where the source impedance may be relatively small in comparison to the line impedance. This is important since line impedance on high voltage long distance transmission lines is usually substantial, thereby making the prior art method of detecting differences in actual line voltages in the detection of interphase faults unreliable.

Another advantage of the present invention is that it provides a three pole trip signal to the three phase trip control circuit for all interphase faults occurring on the three phase power transmission line.

Briefly, in accordance with the present invention, a protective relay circuit is provided for operating a three pole circuit breaker connected in a three phase alternating current power line. The protective relay circuit includes means for developing a first signal representative of a positive sequence symmetrical component voltage derived from the three phase line voltages of the power line at the relay location. Means are also provided for developing a second signal representative of the product of the positive sequence symmetrical component current of the power line and a predetermined constant impedance. First summing means is provided for summing the first and second signals to produce a signal at the output of the first summing means corresponding to $(V_1 - I_1 Z_{1R})$, where $V_1$ is proportional to the positive sequence voltage at the relay monitoring location, I, is proportional to the positive sequence line current and $Z_{1R}$ is the replica impedance, which is proportional to the positive sequence impedance of the line. Means is provided in the protective relay circuit for developing a third signal $(I_0 Z_{1R})$ which is representative of the product of a quantity $I_0$ proportional to the zero sequence symmetrical component of line current and said replica impedance $Z_{1R}$. Second summing means is provided in the protective relay circuit for summing the absolute value of the output of the first summing means which is $|V_1 - I_1 Z_{1R}|$ and the absolute value of the third signal which is $|I_0 Z_{1R}|$ to provide a restraining signal output representative of this sum. Circuit means is provided for generating a signal for use in tripping the three poles of said circuit breaker when said restraining signal falls below a predetermined value.

In another aspect of the present invention, the three pole trip signal output is provided as one of three inputs to an OR gate for providing three pole trip signals to a three phase trip control circuit for tripping the three poles of the breaker. This signal may be gated through the OR circuit with two other inputs. The second input to the OR circuit is a signal generated by operation of a positive sequence distance relay. This latter signal is restrained or negated when a zero sequence overcurrent relay with positive sequence current restraint produces an output upon the occurrence of a single line to ground fault which may be detected by the positive sequence distance relay. Therefore, the second input to the OR circuit insures the detection of heavy close-in interphase faults, but discriminates against single line to ground faults.

The third input to the OR circuit is a signal generated by a positive sequence voltage level detector when said positive sequence voltage is less than or equal to a predetermined value. This signal produces a three pole trip signal at the three phase trip control circuit on heavy close-in double line to ground faults, which may, under certain conditions, not be detected by the circuitry supplying the second input to the OR circuit.

It is known that by use of symmetrical component analysis, certain predetermined values of per unit symmetrical component voltages occur at the site of a fault condition, depending upon the type of fault condition which occurs. For example, the positive sequence symmetrical component voltage equals zero at the fault location when there is a three phase fault. Further, the positive sequence symmetrical component voltage at the fault is equal to approximately two thirds of the source voltage where there is a single line to ground fault, if it is assumed that the three symmetrical component impedances are equal. By the use of these values, voltages appearing at the relay may be used, after compensation for line voltage drops to the point of the fault, to indicate the type of faults which have occurred.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is a schematic diagram, in block diagram form, of one embodiment of protective relay circuits for generating a three pole trip signal in accordance with the present invention.

FIG. 2 is a diagram illustrating the positive sequence voltage at the location of a single line to ground fault.

FIG. 3 is a diagram illustrating the positive sequence voltage at a line to line fault.

FIG. 4 is a diagram illustrating the positive sequence voltage at a double line to ground fault.

FIG. 5 is a diagram illustrating the positive sequence voltage at a three phase fault.

FIG. 6 is a schematic diagram, in block diagram form, of an absolute value summing circuit in accordance with one form of the present invention.

FIG. 7 is a voltage profile diagram representative of the positive sequence voltage along the line to be protected with a three phase fault at the end of the line. FIG. 7 also illustrates the quantity $V_1 - I_1Z_{1R}$ compared to the operate signal $.5kE_1$ under the illustrated fault conditions.

FIG. 8 is a voltage profile diagram similar to FIG. 7 but with a double line to ground fault at the end of the line.

FIG. 9 is a voltage profile diagram similar to FIG. 7 but with a phase to phase fault at the end of the line.

FIG. 10 is a voltage profile diagram similar to FIG. 7 but with a single line to ground fault at the end of the line.

FIG. 11 is a voltage profile diagram similar to FIG. 7 but with a three phase fault at the middle of the line.

FIG. 12 is a voltage profile diagram similar to FIG. 7 but with a double line to ground fault at the middle of the line.

FIG. 13 is a voltage profile diagram similar to FIG. 7 but with a phase to phase fault at the middle of the line.

FIG. 14 is a voltage profile diagram similar to FIG. 7 but with a single line to ground fault at the middle of the line.

DETAILED DESCRIPTION OF THE PREFERRED EMBODIMENTS

Figure 15:
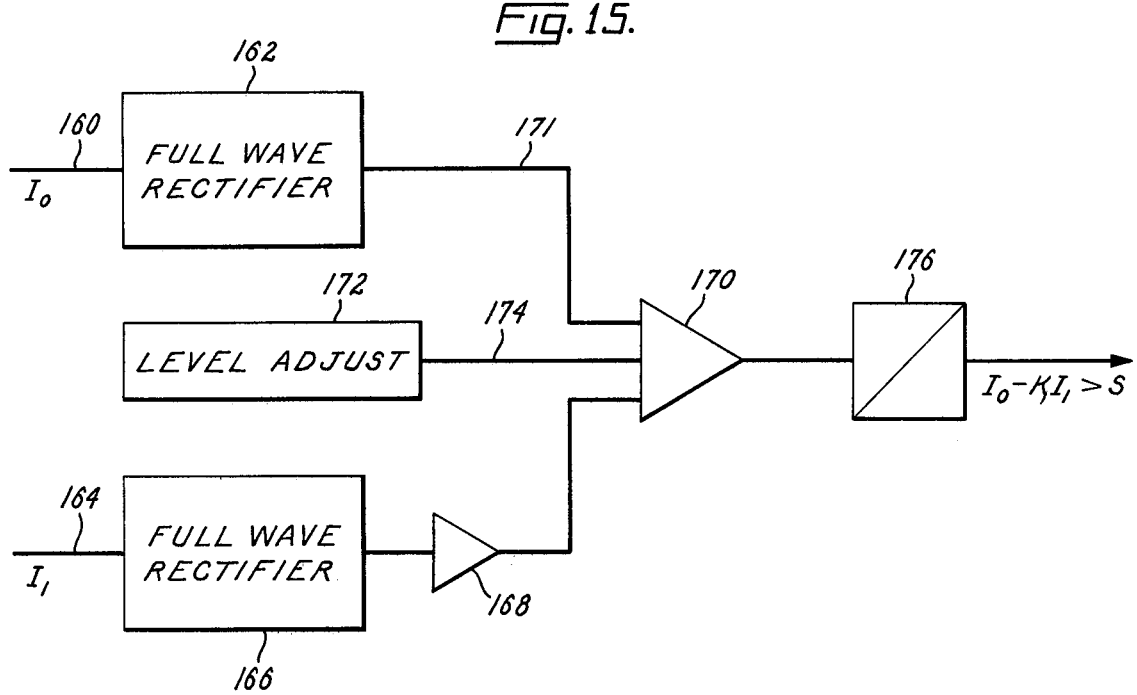
FIG. 15 is a schematic diagram, in block diagram form, of a zero sequence overcurrent relay with positive sequence current restraint utilized in one embodiment of the present invention.

Referring now to the drawings in detail, wherein like numerals indicate like elements, there is shown in FIG. 1 a three phase alternating current power transmission line 10 comprised of conductors 12, 14 and 16. The line is provided with a circuit breaker 18 having poles 20, 22 and 24. Poles 20, 22 and 24 are capable of being operated individually or in unison by three phase trip control circuit 26.

The line 10 is provided with three current transformers, 28, 30 and 32. The outputs of the current transformers 28, 30 and 32 are fed to a transactor circuit 34. Transactor circuits or devices are well known in the art. The secondary voltage output of the transactor is related to the primary current by a complex proportionality constant or vector operator known as the transfer impedance Z of the transactor. The output voltage of the transactor 34 is therefore proportional to the line current multiplied by a preselected constant transfer impedance, where the transfer impedance of the transactor is selected to be equal to the replica impedance $Z_{1R}$. The replica impedance $Z_{1R}$ is proportional to the positive sequence impedance of the line and will be referred to in more detail hereinafter. Further detailed discussion of such a transactor may be had by reference to U.S. Pat. No. 3,374,399-Dewey which is assigned to the assignee herein, and the teachings of which are incorporated herein by reference. Alternatively, a current transformer with a reactor connected across its output may be used in place of transactor 34, as is well known to those skilled in the art.

The outputs of transactor 34 are fed to positive sequence current symmetrical component network 36. Positive, negative and zero sequence current and voltage symmetrical component networks are well known to those skilled in the art, and will not be described herein in detail. Reference may be had to the textbook, Symmetrical Components, referred to above and to U.S. Pat. No. 3,992,651 which issued Nov. 16, 1976 and is assigned to the assignee herein. The output of positive sequence current symmetrical component network 36 is a voltage signal proportional to the inverted product of the positive sequence component of the currents in power line 10 and the replica impedance of line 10, which signal may be designated as $(-I_1Z_{1R})$.

Another voltage signal $V_1$ is generated on line 38 by potential transformer and positive sequence voltage symmetrical component network 40, which signal is proportional to the positive sequence component of the line voltages on power line 10 at the relay monitoring location.

The voltage signal $V_1$ is applied to filter 42. The output of positive sequence current symmetrical component network 36 $(-I_1Z_{1R})$ is fed to filter 44. Filters 42 and 44 are tuned to the fundamental frequency of the alternating current on power transmission line 10. The filters 42 and 44 filter out extraneous signals and transient signals and help to provide a smooth transition between prefault and postfault conditions. Such filters are well known to those skilled in the art. For example, the filters 42 and 44 may be of the type disclosed in connection with FIG. 2 of U.S. patent application Ser. No. 640,308 of the inventor herein which was filed on Dec. 12, 1975 and is now U.S. Pat. No. 4,034,269. However, it is understood that various other suitable filter circuits may be used for filters 42 and 44.

The outputs of filters 42 and 44 are fed to summing amplifier 46. The output of summing amplifier 46 is proportional to the difference between the signal $V_1$ and the signal ($I_1Z_{1R}$). The output of summing amplifier 46 is fed as one input to absolute value summing circuit 48. It will be apparent to those skilled in the art that the summing amplifier 46 may instead be a difference amplifier if the output of positive sequence current symmetrical component network 36 is not inverted as hereinabove described.

For deriving a quantity representative of the zero sequence component of the currents in the line 10, three current transformers, one for each phase, are connected in parallel and have a transactor 56 connected across their terminals, all in a conventional manner. The output across current transformers 50, 52 and 54 is equal to three times the zero sequence current component of the currents in line 10. The output of transactor 56 is proportional to the product of said zero sequence current component and the replica impedance $Z_{1R}$ to produce the output ($I_0Z_{1R}$). The output of transactor 56 is fed through filter 58. Filter 58 may be identical to filters 42 and 44. The output of filter 58 is fed to a second input of absolute value summing circuit 48.

Absolute value summing circuit 48 takes the absolute value of the signals present on each of its inputs and sums these two absolute value component signals to produce a restraining output voltage on line 60 which is equal to $|V_1 - I_1Z_{1R}| + |I_0Z_{1R}|$. Means is provided for producing a three pole trip signal only when the restraining voltage on line 60 falls below a predetermined level. In the illustrated embodiment, this means is an amplitude comparator 62 in which the restraining voltage is compared with a selectable operate voltage on line 64 produced by selectable operate voltage source 66. Amplitude comparator 62 only produces an output $V_{1X}$ when the restraining voltage on line 60 is less than the operate voltage on line 64. The voltage $V_{1X}$ is a three pole trip signal which is supplied via OR gate 68, thereby to control three phase trip control circuit 26.

Summarizing, a three pole trip signal $V_{1X}$ is generated on line 70 for control of the three phase trip control circuit 26 via line 72 when the sum of two absolute value quantities fails to exceed a predetermined value. The first absolute value quantity is generated from the difference between a signal $V_1$ proportional to the positive sequence component of the line voltages and a signal $I_1Z_{1R}$ proportional to the product of the positive sequence component of the line currents and the replica impedance of the line. This first absolute value quantity may be considered to be proportional to the positive sequence voltage for a fault which occurs at the far end of the line, assuming that the replica impedance is selected to be equal to the actual positive sequence line impedance. In practice, the replica impedance $Z_{1R}$ may be selected to be slightly larger than the positive sequence line impedance in order to provide a safety factor in insuring that interphase faults at the end of the line are detected. The aforesaid second absolute value quantity is proportional to the zero sequence component of the line currents multiplied by the replica impedance $Z_{1R}$. The asolute value of the quantity ($I_0Z_{1R}$) is added to the absolute value of the aforesaid first quantity to provide assurance that the three poles of the circuit breaker will not be tripped for single line to ground faults. To explain this further, the quantity ($I_0Z_{1R}$) is typically of significant magnitude for those single line to ground faults where the quantity of ($V_1 - I_1Z_{1R}$) is less than the operating signal level. ($V_1 - I_1Z_{1R}$) is typically less than the operating signal level for single line to ground faults in that portion of the line nearest the relay. Accordingly, for such faults, the addition of $I_0Z_{1R}$ results in a high enough restraining signal on line 60 to prevent the comparator 62 from operating to produce three pole tripping.

As stated hereinabove, if the restraining signal developed on line 60 does not exceed the operate voltage on line 64, the comparator 62 will generate a signal $V_{1X}$, which is effectively supplied to three phase trip control circuit 26 to enable three pole tripping of the breaker, assuming other control conditions develop a signal on line 74 indicating that the detected interphase fault is internal to the line being protected. It is understood that the term "interphase fault" means a fault involving more than a single phase, such as a double line to ground fault, a phase to phase fault or a three phase fault.

Referring still to FIG. 1, OR gate 68 is provided with inputs 86 and 88 in addition to input 70. Input 86 is supplied from the output of AND-gate logic means 90. AND-gate logic means 90 receives an input on line 92 from positive sequence distance relay 94 and an input on an inverting or a not input 96 from zero sequence overcurrent relay 98. Zero sequence overcurrent relay 98 is provided with positive sequence current restraint. These two relays 94 and 98 are typically energized from the same current and potential transformers as used for the already-described relay shown in dotted line box 112.

The positive sequence distance relay 94 may be of a type which is known to those skilled in the art. One such suitable positive sequence distance relay is that manufactured by the General Electric Company which is designated a type SLYP51B and which is described in General Electric's instruction manual GEK-41959. Distance relays are also described in a co-pending application of the inventor herein which is Ser. No. 640,308 which was filed on Dec. 12, 1975 and is assigned to the assignee herein. In FIG. 6 of that application, a single phase distance relay is described in FIG. 6. A positive sequence directional relay is described in FIG. 4. A suitable positive sequence distance relay 94 may be comprised of the distance relay shown in FIG. 6 of that application with positive sequence inputs as described with respect to FIG. 4 of that application. Alternatively, the function of the positive sequence distance relay 94 may be provided by three single phase distance relays, the outputs of which are combined in an AND gate.

In operation, the positive sequence distance relay 94 provides an output signal on line 92 in response to heavy close-in faults on transmission lines 10 which may not be picked up by the circuitry supplying the $V_1X$ signal. The positive sequence distance relay 94 is most sensitive to three phase faults, somewhat less sensitive to double line to ground faults, less sensitive to phase to phase faults and least sensitive to single line to ground faults. However, under certain conditions, positive sequence distance relay 94 may detect a single line to ground fault. Therefore, zero sequence overcurrent relay 98 is provided to detect single line to ground faults. When a single line to ground fault is detected by zero sequence overcurrent relay 98, an output is supplied to not input 96 of AND gate 90, precluding the generation of a signal from the output of AND gate 90 on input line 86 of OR gate 68. The function of zero sequence overcurrent relay 98 with the positive sequence current restraint is to obtain the zero sequence component $I_0$ and subtract from that the positive sequence current $I_1$ multiplied by factor $K_1$. This is usually set to exceed a sensitive setting S. One suitable type of zero sequence overcurrent relay 98 is sold by General Electric as a part of its relay equipment types SLCN51B and SLCN51A. The type SLCN51B equipment including the zero sequence overcurrent relay with positive sequence current restraint is described in General Electric's instruction manual GEK45397. A preferred embodiment of the zero sequence overcurrent relay with positive sequence current restraint is shown in FIG. 15 hereof and will be described hereinafter.

The third input to OR gate 68 on line 88 is provided by a positive sequence voltage level detector 100 which detects the condition where the positive sequence voltage component $V_1$ is less than or equal to a predetermined constant $K_V$. In a preferred embodiment, the typical value $K_V$ is set to be proportional to 0.5 per unit positive sequence voltage. However, it is understood that various other values may be selected for $K_V$. Positive sequence voltage level detector 100 takes the voltage $V_1$, as may be generated on output line 38 of potential transformer and positive sequence voltage symmetrical component network 40, and compares it with the preselected constant voltage $K_V$. If the positive sequence voltage $V_1$ falls below the preselected constant voltage, an output is generated on line 88 which causes a three pole trip signal to be developed on line 72 via OR gate 68.

Figure 16:
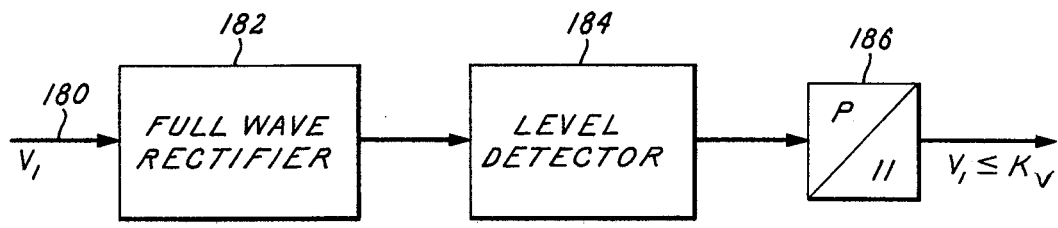
FIG. 16 is a schematic diagram, in block diagram form of a positive sequence voltage level detector utilized in one embodiment of the present invention.

The positive sequence voltage level detector 100 insures detection of double line to ground faults, especially where there is a low ratio of zero sequence source impedance $Z_{0S}$ to positive sequence $Z_{1S}$. Positive sequence voltage level detector will also detect heavy close-in three phase faults. Positive sequence voltage level detector 100 may be considered to be a positive sequence undervoltage relay. Positive sequence undervoltage and overvoltage relays are known in the art. A preferred embodiment of positive sequence voltage level detector 100 is illustrated in FIG. 16 described hereinafter.

The operation of the circuitry herein will now be described. Particularly the generation of the three pole trip signal $V_{1X}$ by the circuitry of FIG. 1 enclosed in dotted line 112 will be described and particularly the consideration involved in selecting the predetermined constant voltage output of selectable operate voltage unit 66 which is applied to amplitude comparator 62 via line 64. As discussed above, amplitude comparator 62 compares a restraining signal equal to the sum of the two absolute value quantities to the predetermined constant voltage output of selectable operate voltage unit 66, and produces a three pole trip output signal $V_{1X}$ when the restraining signal is less than the preselected constant reference or operate voltage on line 64.

The predetermined reference voltage or operate voltage on line 64 is determined by consideration of the symmetrical component voltages which occur during various types of faults on a three phase line. It is known, with certain reasonable assumptions on the relation between the positive sequence, negative sequence and zero sequence impedances at the fault location, that a certain predetermined positive sequence per unit voltage will appear at the fault location for a predetermined type of fault. More particularly, referring to FIG. 2, and assuming that the positive sequence impedance $Z_1$, the negative sequence impedance $Z_2$ and zero sequence impedance $Z_0$ are equal, a single line to ground fault will cause the positive sequence voltage $V_{1F}$ at the fault 76 to be equal to two thirds of $E_1$, where $E_1$ is the positive sequence voltage of the source.

Referring now to FIG. 3, there is shown a symmetrical component diagram which illustrates the per unit voltage, under the above assumptions, which is generated at a line to line fault occurring at point 78. As illustrated in FIG. 3, the voltage $V_{1F}$ occurring at a fault at point 78 would be equal to one half of the source voltage $E_1$ or in other words, one half of the per unit positive sequence symmetrical component voltage.

Referring now to FIG. 4, there is shown a diagram which illustrates the voltage $V_{1F}$ which occurs at a double line to ground fault at point 80. The voltage occurring at the fault would be one third of the voltage $E_1$ or in other words one third of the per unit positive sequence symmetrical component voltage. Again, this is exactly correct when the assumption is made that the three symmetrical component impedances $Z_1$, $Z_2$ and $Z_0$ are equal. In practice, the positive sequence impedance $Z_1$ and the negative sequence component impedances are substantially equal. The system operates fairly well as long as the ratio of the total zero sequence impedance $Z_0$ to the total positive sequence impedance $Z_1$ falls between 0.5 and 2.5, and the ratio of the zero sequence line impedance $Z_{0L}$ to the positive sequence line impedance $Z_{1L}$ is equal to or greater than 3, which is typical for aerial lines.

Referring to FIG. 5, there is shown a diagram for a three phase fault condition. In a three phase fault condition, the voltage $V_{1F}$ at a three phase fault 82 is equal to 0.

To illustrate operation of the portion of the circuit in FIG. 1 relating to the generation of the signal $V_{1X}$, which is circuitry 112, assume that a three phase fault occurs at the end of the line. The operation of this portion of the circuit may be best understood by reference simultaneously to FIGS. 1, 5 and 7. FIG. 7 is a voltage profile representative of the positive sequence voltages on a three phase line with a three phase fault at the remote end 84 of the line. The prefix $k$ appearing in the quantities $kE_1$ and $kV_{1F}$ denotes that these quantities bear the same proportionality relationship to the quantities $E_1$ and $V_{1F}$, respectively, that $V_1$ bears to the actual positive sequence voltage appearing on line 10 at the relay location. The replica impedance $Z_{1R}$ is preferably selected to be 125% of the positive sequence impedance of the line $Z_{1L}$, and is shown as such in FIGS. 7 through 14. However, it is understood that other suitable percentages of $Z_{1L}$ may be selected, and under certain conditions, it may be desirable to select $Z_{1R}$ to be less than 100% of $Z_{1L}$. In a preferred embodiment of the present invention, the operate voltage on line 64 applied to amplitude comparator 62 is selected to represent one half of the minimum per unit positive sequence voltage at the relay under no-fault conditions, i.e., $0.5kE_1$.

The selection of the operate voltage on line 64 is based on consideration of the positive sequence voltage at the fault for a phase-to-phase fault and that for a single line to ground fault. More specifically, this operate voltage should be representative of a positive sequence voltage that is approximately equal to or above the positive sequence voltage at the fault for a phase-to-phase fault and below the lowest positive sequence voltage at the fault for a single line to ground fault.

Referring to FIGS. 2 and 3, this means that the operate voltage should be in the range of about $0.5kE_1$ to $0.67kE_1$. To minimize the possibility of undesired three-pole tripping being initiated by circuit 112 when one pole is already open and the relay potential source is on the line side of the circuit breaker, the operate voltage is selected at the low end of the range, i.e., at $0.5kE_1$. To compensate for selection of the operate voltage at the low end of the range, the replica impedance $Z_{1R}$ has been selected to be larger than the positive sequence impedance $Z_{1L}$ of the line, i.e., 125% $Z_{1L}$.

Referring to FIGS. 1, 5 and 7 collectively, the operation of the portion of the circuit which generates the signal $V_{1X}$, shown within dotted line 112, will be described for a three phase fault at the end of the line. The relay location on the line 10 in each of the FIGS. 7 through 14 is designated by the numeral 110. The circuitry 112 for generating the signal $V_{1X}$ is shown in FIG. 1. The circuitry 112 produces an output when the sum of the first and second absolute values is less than the selected predetermined operate voltage selected in selectable operate voltage unit 66. This may be expressed by the following formula:

$$0.5kE_1 > |V_1 - I_1Z_{1R}| + |I_0Z_{1R}|$$

Since $V_1 = kV_{1F} + I_1Z_{1L}$, and $I_0 = 0$ on a three phase fault, the above formula simplifies to:

$$0.5kE_1 > |kV_{1F} + I_1Z_{1L} - 1.25 I_1Z_{1L}| + |0|$$

By referring to FIG. 5, it is seen that $kV_{1F} = 0$ on a three phase fault, and the voltage $kE_1 = I_1 (Z_{1L} + Z_{1S})$ wherein $Z_{1L}$ is the positive sequence impedance of the line and $Z_{1S}$ is the positive sequence impedance of the line from the relay to the source as indicated in FIG. 7. The above formula therefore simplifies to:

$$0.5I_1(Z_{1L} + Z_{1S}) > |-0.25 I_1Z_{1L}|$$

It may therefore be seen that the quantity on the left which contains $(0.5I_1Z_{1L})$ must be greater than the $(0.25 I_1Z_{1L})$ on the right. Therefore, a signal $V_{1X}$ will be generated and a three pole trip signal will be supplied via OR gate 68, and line 72 to three phase trip control circuit 26. These conditions are illustrated graphically in the voltage profile diagram shown in FIG. 7. The preselected setting $0.5kE_1$ is selected herein in a preferred embodiment and for the purposes of illustration, and is illustrated at 114 in FIGS. 7 through 14. As may be seen from FIG. 7, the positive sequence voltage at the end of the line at point 84 is zero under a three phase fault condition. The voltage $V_1$ at the relay is equal to $(I_1)$ $(Z_{1L})$, where $Z_{1L}$ is the positive sequence impedance of the line from the fault to the relay location. The voltage $kE_1$ may be expressed as the quantity $(I_1) (Z_{1L} + Z_{1S})$. This may be expressed as the fact that $E_1$ is equal to the positive sequence current times the sum of the impedance of the positive sequence line and source impedances. Since $Z_{1R}$ has been selected to be equal to 1.25 $Z_{1L}$, the quantity $(V_1 - I_1Z_{1R})$ is a negative quantity which is approximately half of the setting of $0.5kE_1$ which is shown at 114. Therefore, a signal $V_{1X}$ is generated in response to this condition of FIG. 7.

The operation of circuitry 112 in the case of a double line to ground fault at the end of the line may be best understood by reference to FIGS. 1, 4 and 8. The fault is illustrated on the voltage profile of FIG. 8 at point 124. Again, we start with the formula of the function of circuitry 112 which is:

$$0.5kE_1 > |V_1 - I_1Z_{1R}| + |I_0Z_{1R}|$$

where $V_1 = \frac{1}{3}kE_1 + I_1Z_{1L}$ when $V_{1F} = \frac{1}{3}E_1$ from FIG. 4, and $I_0Z_{1R} = I_0 (1.25Z_{1L})$, and making the reasonable assumptions that $(Z_{0L}/Z_{1L}) = 3$, where $Z_{1L}$ is the positive sequence line impedance and $Z_{0L}$ is the zero sequence line impedance, and further assuming that $Z_{0S} = Z_{1S} = 0.125Z_{1L}$, where $Z_{0S}$ is the zero sequence source impedance and $Z_{1S}$ is the positive sequence source impedance, and assuming that $Z_{1R} = 1.25 Z_{1L}$ and from FIG. 4 that $$I_0 = \frac{\frac{1}{3}kE_1}{Z_0} = \frac{kE_1}{3(Z_{0L} + Z_{0S})} = \frac{kE_1}{3(3Z_{1L} + .125Z_{1L})}$$

the function further simplifies to $$.5kE_1 > \left|\frac{1}{3} kE_1 + I_1Z_{1L} - (1.25) I_1Z_{1L}\right| +$$

$$\left|\frac{1}{3} \frac{kE_1}{(3Z_{1L} + .125 Z_{1L})} \frac{(1.25Z_{1L})}{1}\right|$$

which further simplifies to:

$$0.5kE_1 > |\tfrac{1}{3} kE_1 - 0.25 I_1Z_{1L}| + |0.134 kE_1|$$

which simplifies to:

$$0.5kE_1 > |0.467kE_1 - 0.25 I_1Z_{1L}|,$$

making it apparent that the left side is larger than the right side thereby assuring generation of the three pole trip signal $V_{1X}$. Referring to FIG. 8, it may be seen that the positive sequence voltage profile shows, consistent with FIG. 4, that the positive sequence voltage at the fault $V_{1F}$ is equal to $\frac{1}{3} E_1$. The quantity $(V_1 - I_1Z_{1R})$ is now a positive value which is less than $kV_{1F}$. It may be noted that the positive sequence distance relay 94 produces an output whenever the quantity $(V_1 - I_1Z_{1R})$ is negative.

Under the conditions of a phase to phase fault at the end of the line to be protected, as shown at point 126 in the voltage profile of FIG. 9, the function of circuitry 112 of FIG. 1 is again set forth by the following formula:

$$0.5kE_1 > |V_1 - I_1Z_{1R}| + |I_0Z_{1R}|$$

with the conditions that $I_0 = 0$ on a phase to phase fault and $Z_{1R} = 1.25Z_{1L}$, and from FIG. 3, $V_{1F} = \frac{1}{2} E_1$, and therefore $V_1 = \frac{1}{2} kE_1 + I_1Z_{1L}$, therefore this function simplifies to:

$$0.5kE_1 > |\tfrac{1}{2} kE_1 - 0.25Z_{1L}| + |0|$$

It is therefore readily apparent that the left side is greater than the right side and that a three pole trip signal $V_{1X}$ will be generated.

Referring to FIG. 9, it may readily be seen that the three pole trip signal $V_{1X}$ will be generated since the quantity $(V_1 - I_1Z_{1R})$ is less than the preselected level of $0.5kE_1$ as shown by the dotted line 114. The positive sequence voltage $V_{1F}$ at the point of the fault 126 at the end of the line is, from FIG. 3, equal to $\frac{1}{2} E_1$. As may be seen from FIG. 9, as long as $Z_{1R}$ is selected greater than $Z_{1L}$ under the set of conditions specified, the three pole trip signal $V_{1X}$ will be generated by circuitry 112.

Referring now to FIGS. 1, 2 and 10, with respect to a single line to ground fault, it may be seen that the exact value of $I_O$ does not have to be calculated since the quantity $|V_1 - I_1Z_{1R}|$ is greater than $0.5kE_1$. The addition of the $|I_OZ_{1R}|$ quantity would only make the absolute quantity even greater, not changing the output of circuitry 112. With reference to FIG. 2, it may be seen that $V_{1F}$ is equal to approximately two thirds $E_1$. Therefore, by referring to FIGS. 2 and 10, it is apparent that the voltage drop from $E_1$ to $V_{1F}$ is approximately one third per unit voltage, or in other words, one per unit voltage minus two thirds per unit voltage is equal to approximately one third per unit voltage. Therefore, the drop to 1.25 times the length of the line is approximately 0.4. Therefore, the quantity $(V_1 - I_1Z_{1R})$ is equal to approximately $0.6kE_1$ which is greater than $0.5kE_1$. Therefore, the three pole trip signal $V_{1X}$ will not be generated on the single line to ground fault.

Similar calculations could be carried out for faults occurring at the middle of the line or at any other location along the line. However, it may be instructive to examine FIGS. 11, 12, 13 and 14 without unduly lengthening the description with all of the calculations. Referring now to FIG. 11, which illustrates a three phase fault occurring at the middle of the line, it may be seen that the three pole signal $V_{1X}$ will not be generated by circuitry 112, but since the quantity $(V_1 - I_1Z_{1R})$ is negative, positive sequence distance relay 94 will generate an output. Under these conditions, zero sequence overcurrent relay 98 will not generate an output on input line 96 to AND gate 90. Therefore, a signal will be generated on input 86 to OR gate 68, causing a three pole trip signal to be supplied via line 72 to the three phase trip control circuit 26.

Referring now to FIG. 12 in connection with a double line to ground fault occurring at point 118 at the middle of the line, it may be seen that the positive sequence voltage at the fault $V_{1F}$ is larger than one third $E_1$ due to the zero sequence impedance of the line $(Z_{0L})$ being much larger than the positive sequence impedance of the line $(Z_{1L})$. The quantity $(V_1 - I_1Z_{1R})$ is illustrated in relation to the level setting 114. It may be calculated that the quantity $I_OZ_{1R}$ would be equal to approximately $0.264kE_1$. Therefore, although the sum of the two absolute value components of the signal would be close to the level $0.5kE_1$, the three pole trip signal $V_{1X}$ would be generated. In any event, since the quantity $(V_1 - I_1Z_{1R})$ is negative, the positive sequence distance relay circuit 94 would generate an output on line 92 to AND gate 90. Under these circumstances, there would not be a restraining signal on input 96 of AND gate 90. Therefore, a three pole trip signal would be present on input 86 of OR gate 68, thereby supplying a three pole trip signal via line 72 to three phase trip control circuit 26.

Referring now to FIG. 13, there is shown a positive sequence voltage profile for a line 10 having a phase to phase fault located at point 120, which is the mid-point of the line. Under these conditions, the zero sequence current $I_O$ would be equal to 0. As may be seen from FIG. 13, the quantity $(V_1 - I_1Z_{1R})$ is negative and is substantially less than the selected predetermined value of $0.5kE_1$, indicated by the dotted line 114. Therefore the three pole trip signal $V_{1X}$ would be generated by circuitry 112 and the positive sequence distance relay 94 would provide an output signal to AND gate 90 via input 92.

Referring now to FIG. 14, there is shown a voltage profile for a single line to ground fault occurring on line 10 at point 122, which is the midpoint of line 10. The voltage at the fault $V_{1F}$ is larger than two thirds $E_1$ since $Z_{0L}$ is much larger than $Z_{1L}$, as may be seen from FIG. 2. It may be seen that under these conditions, a three pole trip signal is not generated. The positive sequence distance relay circuitry 94 does not generate an output since the quantity $(V_1 - I_1Z_{1R})$ is positive. The three pole trip signal $V_{LX}$ is not developed since the sum of the absolute value quantities will exceed the level $0.5kE_1$. In fact, the quantity $(V_1 - I_1Z_{1R})$ alone exceeds the value $0.5kE_1$. Positive sequence voltage level detector 100 will not produce an output since the voltage $V_1$ will exceed the value of $K_V$. $K_V$ is a preferred embodiment may be selected to be equal to a quantity representing 0.5 per unit voltage.

It will be apparent from the above discussion and the voltage profiles of FIGS. 7–14 that if $Z_{1S}$ was substantially smaller than shown in FIGS. 7–14, there would be little change in the voltage profile line, with the result that the restraining quantity $(V_1 - I_1Z_{1R})$ would be less positive or more negative than illustrated by only a small amount. As a result, this reduced source impedance would have little effect on the relationship between the operate voltage $0.5kE$, and the restraining quantity $(V_1 - I_1Z_{1R})$, especially for faults near the remote end of the line.

Referring now to FIG. 6, there is shown circuitry 140 which may be used to perform the absolute value summation function performed by absolute value summing circuit 48 in FIG. 1. The absolute value summing circuit 140 is provided with an input $(I_OZ_{1R})$ on input line 142 to full wave rectifier circuit 144. The signal output from summing amplifier 46 which is $(V_1 - I_1Z_{1R})$ may be applied to the input 146 of full wave rectifier 148. Full wave rectifiers 144 and 148 may be conventional and well known rectifier circuits such as those described in the co-pending application Ser. No. 640,308 of the inventor herein, which is assigned to the assignee hereof. However, it is understood that various types of full wave rectifier circuits well known to those skilled in the art may be used in carrying out the present invention. The full wave rectified outputs of full wave rectifier circuits 144 and 148 are fed via lines 150 and 152 to summing amplifier 154. The output of summing amplifier 154 on output 156 may be the restraint signal shown on line 60 of FIG. 1. In an alternate embodiment of the present invention, the function of the amplitude comparator 62 and the absolute value summing circuit 48 may be combined in circuitry 140 by providing a biasing signal or operate voltage on input 158 to summing amplifier 154, which is shown in dotted lines. In this alternate embodiment, summing amplifier 154 would produce a three pole trip signal $V_{1X}$ on line 156 whenever the sum of the absolute value signals on input lines 150 and 152 did not exceed the operate voltage signal applied to input 158 for an appropriate time as determined by a timer (not shown) contained in summing amplifier 154 in order to minimize the effect of the ripple output of the full wave rectifiers. It is understood by those skilled in the art that this is one modification which may be made to the present invention to reduce the amount of hardware required.

Referring now to FIG. 15, there is shown one embodiment of a zero sequence overcurrent relay with positive sequence current restraint. A zero sequence current component signal $I_O$ is fed via line 160 to full wave rectifier 162. A positive sequence current component signal $I_1$ is fed via line 164 to full wave rectifier 166. Full wave rectifiers 162 and 166 may be similar to the full wave rectifier circuits 144 and 148. The output of full wave rectifier circuit 166 is fed via inverting amplifier 168 to summing amplifier 170. The output of full wave rectifier 162 is fed via input line 171 to summing amplifier 170. A bias signal or level adjust signal is provided to summing amplifier 170 from level adjust circuit 172 via line 174. The level adjust circuit 172 supplies the value of S in the output function which is $(I_O - K_1 I_1) > S$. S is a selected sensitive value. The value of $K_1$ is inserted into the circuit by the selection and/or adjustment of resistors, which may be variable, in the input circuitry of amplifier 170. The output of the summing amplifier 170 is fed to a timer 176 which detects the required function output for a predetermined minimum period of time, such as 90 electrical degrees, to prevent operation on the ripple effect of the rectifier outputs.

Referring now to FIG. 16, there is shown a circuit in block diagram form which may be used as a positive sequence voltage level detector to detect the condition that the positive sequence voltage at the relay is less than a predetermined constant value $K_V$. As pointed out hereinabove, the value $K_V$ is preferably selected to be equal to a quantity representing 0.5 per unit voltage. The positive sequence voltage at the relay $V_1$, which may be obtained from output 38 of potential transformer and positive sequence voltage symmetrical component network 40, is fed via line 180 to full wave rectifier 182. Full wave rectifier 182 may be similar to full wave rectifiers 144 and 148. The output of full wave rectifier 182 is fed to a level detector 184 which detects the condition that $V_1$ is less than or equal to the preselected constant value $K_V$. The output of level detector 184 is fed to a timer 186 which insures that the condition of $V_1$ being less than or equal to $K_V$ exists for a predetermined minimum period of time in order to prevent the circuit from operating on the ripple output of the rectifiers.

The present invention may be embodied in other specific forms without departing from the spirit or essential attributes thereof, and, accordingly, reference should be made to the appended claims, rather than to the foregoing specification as indicating the scope of the invention.

What is claimed as new and desired to be secured by Letters Patent of the United States is:

1. A protective relay circuit for controlling tripping of three poles of a circuit breaker connected in a three phase alternating current power line in response to a fault involving more than a single phase, comprising:
   (a) means for developing a first signal representative of the positive sequence symmetrical component of the line voltages of said power line at the relay location,
   (b) means for developing a second signal representative of the product of the positive sequence symmetrical component of the currents in said power line and a predetermined constant impedance;
   (c) means for summing said first and second signals to produce a difference output signal representative of said first signal minus said second signal;
   (d) means for developing a third signal which is representative of the product of the zero sequence symmetrical component of the currents in said power line and said predetermined constant impedance;
   (e) means for summing the absolute value of the difference output signal of said summing means and the absolute value of said third signal to provide a restraining signal output representative of the sum of said absolute values; and
   (f) comparator means for generating a three pole trip signal output for controlling tripping of said circuit breaker in response to the restraining signal falling below a selected predetermined value.

2. A protective relay circuit as recited in claim 1 which further comprises:
   (a) a positive sequence symmetrical component distance relay for providing a fault signal output upon the detection of predetermined fault conditions in said power line;
   (b) a zero sequence overcurrent relay with a positive sequence current restraining function for producing a signal output in response to a single line to ground fault;
   (c) logic means for restraining the fault signal output of the positive sequence distance relay when said zero sequence overcurrent relay produces a signal output, but otherwise providing an output signal in response to the presence of a fault signal output of the positive sequence symmetrical component distance relay; and
   (d) OR circuit means for receiving as inputs the output signal of said logic means and the output signal of said comparator means for controlling the tripping of the three poles of the circuit breaker in response to reception of either the output signal of said logic means or the output signal of said comparator means.

3. A protective relay circuit as recited in claim 1 which further comprises:
   (a) a positive sequence voltage level detector responsive to the positive sequence symmetrical component voltage of the line voltages of said power line, said positive sequence voltage level detector producing an output signal when said positive sequence symmetrical component voltage falls below a predetermined level, and
   (b) OR circuit means for receiving the output signal of said positive sequence voltage level detector and the output signal of said comparator means for controlling the tripping of the three poles of the circuit breaker in response to reception by the OR circuit of either of said inputs.

4. A protective relay circuit as recited in claim 2 which further comprises:
   a positive sequence voltage level detector responsive to the positive sequence symmetrical component of the line voltages of said power line, said positive sequence voltage level detector producing an output signal when said positive sequence symmetrical component of the line voltages falls below a predetermined level, said OR circuit means receiving as a third input the output signal of said positive sequence voltage level detector and acting to provide a signal for controlling tripping of the three poles of the circuit breaker in response to reception by the OR circuit of any one of said three inputs.

5. A protective relay circuit as recited in claim 1 wherein said comparator means comprises a comparator circuit and means for producing a selectable operate voltage having a predetermined reference level, said comparator circuit comparing said restraining signal with said predetermined operate voltage and producing a three pole trip signal output in response to the restraining signal falling below said predetermined reference voltage level.

6. A protective relay according to claim 1 in which:
 (a) said first signal is related to said positive sequence component of the line voltages at the relay location by a predetermined proportionality factor k, and
 (b) said selected predetermined value of (f), claim 1, is between about .5 and .6 times the minimum positive sequence component of the line voltages appearing at the relay location under no-fault conditions times said proportionality factor.

7. A protective relay according to claim 1 in which:
 (a) said first signal is related to said positive sequence component of the line voltages at the relay location by a predetermined proportionality factor k, and
 (b) said selected predetermined value of (f), claim 1, is above k times the positive sequence voltage appearing at a fault on said line for a phase-to-phase fault and below k times the lowest positive sequence voltage at the fault for a single line to ground fault on the power line.

8. A protective relay circuit in accordance with claim 1 wherein said means for summing said first and second signals to produce a difference output signal includes a summing amplifier provided with a first and a second input, each of said first and second inputs being provided with filter circuits, said first input receiving said first signal and said second input receiving an inverted second signal.

9. A protective relay circuit in accordance with claim 1 wherein said means for developing said third signal is comprised of zero sequence current transformer means coupled to said three phase alternating current power line, means for multiplying the output of said zero sequence current transformer means by said predetermined constant impedance, and a filter circuit for filtering said multiplied output.

10. A protective relay circuit in accordance with claim 1 wherein said absolute value summing means includes a summing amplifier provided with a first and a second input, each of said first and second inputs being provided with a full wave rectifier circuit, said first full wave rectifier circuit receiving said difference output signal and said second full wave rectifier circuit receiving said third signal, said output of said summing amplifier being said restraining signal output.

11. The protective relay circuit of claim 1 in which: said means of (e) and (f) are combined in a composite circuit having three inputs, two of said inputs respectively receiving quantities representing said two absolute values and the third input receiving a signal having a value corresponding to said selected predetermined value, said composite circuit acting to sum said absolute values, compare the sum to said selected predetermined value, and to produce an output corresponding to said three pole trip signal output only when the sum of said absolute values is less than said selected predetermined value.

12. A protective relay circuit for controlling tripping of three poles of a circuit breaker connected in a three phase alternating current power line upon the occurrence of a fault condition involving more than one of the three conductors of the power line, comprising:
 (a) OR circuit means provided with a first, a second and a third input and an output, said OR circuit means providing a signal output in response to a signal being applied to at least one of said inputs;
 (b) means for initiating tripping of said three poles of the circuit breaker in response to a signal output being developed on said output of said OR circuit means;
 (c) first circuit means for providing a three pole trip signal to said first input of said OR circuit means, said first circuit means generating said trip signal in response to a restraining signal falling below a predetermined value, said restraining signal being representative of the sum of first and second absolute value quantities, said first absolute value quantity being a difference signal representative of a first signal less a second signal, said first signal being representative of the positive sequence symmetrical component voltage of the line at the relay location, and said second signal being representative of the product of the positive sequence positive sequence component of line current and a replica impedance representative of the positive sequence impedance of said power line, said second absolute value quantity being the absolute value of a third signal which is representative of the product of the zero sequence symmetrical component current and the replica impedance of said power line;
 (d) second circuit means for producing a second three pole trip signal on said second input of said OR circuit means, said second circuit means including: a positive sequence distance relay, a zero sequence overcurrent relay provided with positive sequence current restraint, and logic means for restraining the output of said distance relay while said overcurrent relay is producing an output but producing said second trip signal when said distance relay is unrestrained by said overcurrent relay, and
 (e) third circuit means for provding a third three pole trip signal to said third input of said OR circuit means, said third circuit means including a positive sequence voltage level detector, said positive sequence voltage level detector producing said third trip signal when the positive sequence symmetrical component voltage of said power line falls below a predetermined level.

* * * * *